United States Patent
Skoczlas et al.

(10) Patent No.: US 9,337,642 B2
(45) Date of Patent: May 10, 2016

(54) SURGE PROTECTION APPARATUS HAVING MULTIPLE SURGE PROTECTION DEVICES AND DISPLAY

(71) Applicant: Eaton Corporation, Cleveland, OH (US)

(72) Inventors: James N. Skoczlas, Bridgeville, PA (US); Vincent Ferri, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 236 days.

(21) Appl. No.: 14/098,793

(22) Filed: Dec. 6, 2013

(65) Prior Publication Data
US 2015/0162739 A1    Jun. 11, 2015

(51) Int. Cl.
| | |
|---|---|
| H02H 1/00 | (2006.01) |
| H02H 1/04 | (2006.01) |
| H02H 3/22 | (2006.01) |
| H02H 9/06 | (2006.01) |
| H02H 3/05 | (2006.01) |
| H02H 3/20 | (2006.01) |
| H02H 3/04 | (2006.01) |

(52) U.S. Cl.
CPC . *H02H 3/05* (2013.01); *H02H 3/04* (2013.01); *H02H 3/20* (2013.01)

(58) Field of Classification Search
CPC .................... H02H 3/20; H02H 9/04
USPC ......................... 361/91.1, 117–119
See application file for complete search history.

(56) References Cited

U.S. PATENT DOCUMENTS

| | | | |
|---|---|---|---|
| 6,411,482 B1 | 6/2002 | Funke | |
| 6,636,409 B2 | 10/2003 | Kladar et al. | |
| 7,307,823 B2 | 12/2007 | Dabrowski et al. | |
| 7,511,933 B2 | 3/2009 | Hartman et al. | |
| 2007/0201177 A1* | 8/2007 | Kladar | H01C 7/126 361/118 |
| 2013/0135781 A1* | 5/2013 | Natili | H02H 3/20 361/91.2 |

* cited by examiner

*Primary Examiner* — Dharti Patel
(74) *Attorney, Agent, or Firm* — Eckert Seamans Cherin & Mellott, LLC; Philip E. Levy; Grant E. Coffield

(57) ABSTRACT

A surge protection apparatus includes a first surge protection device (10) having a number of first transient suppressing elements, a second surge protection device having a number of second transient suppressing elements, and a circuit coupled to the surge protection devices. The circuit has a number of display elements, wherein the circuit is structured to receive input signals from the first and second surge protection devices and (i) responsive to any one of the first transient suppressing elements failing, causes the number of display elements to provide a first indication indicating that at least one of the first transient suppressing elements has failed, and (ii) responsive to any one of the second transient suppressing elements failing, cause the number of display elements to provide a second indication indicating that at least one of the second transient suppressing elements has failed.

14 Claims, 1 Drawing Sheet

SURGE PROTECTION APPARATUS HAVING MULTIPLE SURGE PROTECTION DEVICES AND DISPLAY

BACKGROUND

1. Field

The disclosed concept relates generally to surge protection devices, and in particular to a surge protection apparatus having multiple surge protections devices and a display which indicates which one of the surge protections devices, if any, has experienced a failure.

2. Background Information

Electrical systems, such as electrical power distribution systems, periodically experience over-voltage conditions, such as transient over-voltage conditions, also called "surges." Over-voltage conditions are problematic to electrical systems because they may cause damage to the loads, such as electronic devices or other hardware, that are coupled thereto. As a result, surge protection devices (SPDs) have been developed to protect the loads from over-voltages that would otherwise damage the loads. SPDs typically provide such protection by coupling various types of known transient-suppressing elements between the phase, and neutral and/or ground conductors of an electrical power distribution system.

As is known in the art, transient-suppressing elements, such as metal-oxide varistors (MOVs), silicon avalanche diodes (SADs) and gas discharge tubes (GDTs), typically assume a high impedance state under normal operating voltages. When the voltage across a transient-suppressing element exceeds a predetermined threshold rating, however, the impedance of the element drops dramatically, essentially short-circuiting the electrical conductors and "shunting" the current associated with the over-voltage through the transient-suppressing element and away from the load.

MOVs are probably the most commonly used transient-suppressing element. An MOV consists of two plates separated by an insulator, such as a metal oxide, that has a known voltage breakdown characteristic. When the voltage between the two plates reaches a certain level (the voltage breakdown level), the insulator breaks down and conducts current. MOVs, however, have operational limitations that must be taken into account when designing an SPD. Specifically, all MOVs have a maximum surge current rating that, if exceeded, may cause the MOV to fail. An MOV may also fail if subjected to repeated operation, even if the maximum transient current rating is never exceeded. The number of repeated operations necessary to cause failure is a function of the magnitude of the transient current conducted by the MOV during each operation: the lower the magnitude, the greater the number of operations necessary to cause failure.

In light of these limitations, prior art SPDs have been developed that use multiple MOVs in a parallel combination such that the MOVs share the total transient current. Each individual MOV in such a configuration only conducts a portion of the total transient current, making it less likely that any individual MOV will exceed its maximum transient current capacity. In addition, an SPD that uses a plurality of parallel MOVs can withstand a greater number of operations because of the lower magnitude of transient current conducted by each individual MOV. If internally fused and sorted by V/I characteristics, a parallel combination of MOVs is advantageous because the failure of any individual MOV will not cause a complete loss of SPD functionality.

There is room for improvement in the field of SPDs.

SUMMARY

In one embodiment, a surge protection apparatus is provided that includes a first surge protection device having a number of first transient suppressing elements, a second surge protection device having a number of second transient suppressing elements, and an I/O circuit coupled to the first surge protection device and the second surge protection device. The circuit has a number of display elements, wherein the circuit is structured and configured to receive input signals from the first surge protection device and the second surge protection device and (i) responsive to any one of the first transient suppressing elements failing, causes the number of display elements to provide a first indication indicating that at least one of the first transient suppressing elements has failed, and (ii) responsive to any one of the second transient suppressing elements failing, cause the number of display elements to provide a second indication indicating that at least one of the second transient suppressing elements has failed. In another embodiment, a method of indicating failures in a surge protection apparatus having a first surge protection device having a number of first transient suppressing elements, and a second surge protection device having a number of second transient suppressing elements. The method includes receiving input signals from the first surge protection device and the second surge protection device, responsive to the input signals indicating that any one of the first transient suppressing elements has failed, providing a first visual indication indicating that at least one of the first transient suppressing elements has failed, and responsive to the input signals indicating that any one of the second transient suppressing elements has failed, providing a second visual indication indicating that at least one of the second transient suppressing elements has failed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
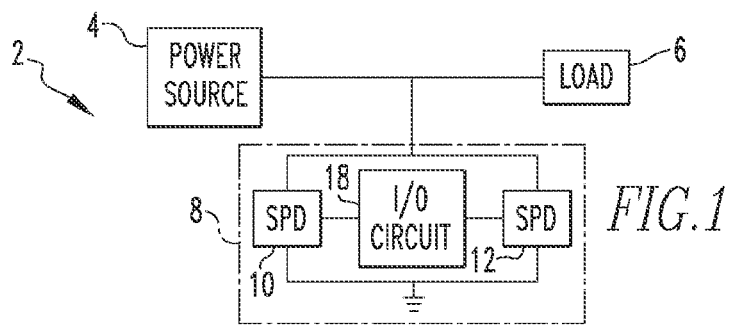
FIG. 1 is a schematic diagram of an electrical system according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 is a schematic diagram of an electrical system 2 according to an exemplary embodiment of the disclosed concept. As seen in FIG. 1, electrical system 2 includes a power source 4, which may be, for example and without limitation, a single phase or three phase AC electrical distribution system. Electrical system 2 further includes a load 6, such as an electronic device or other hardware. In addition, to protect load 6 from over-voltages that might otherwise damage load 6, electrical system 2 includes a dual surge protection device 8. Dual surge protection device 8 is described in greater detail herein and provides such protection by coupling a number of transient-suppressing elements in parallel with load 6 between power source 4 and the neutral and/or ground (the illustrated embodiment) conductors of power source 4.

According to one aspect of the disclosed concept, dual surge protection device 8 enhances performance by providing a higher current rating than would normally be possible. Dual surge protection device 8 provides this enhanced performance by including two surge protection devices therein that are connected in parallel with one another. As a result, dual surge protection device 8 is able to provide increased current protection as compared to a single surge protection device (e.g., two times the rating; 800,000 amps as opposed to 400,000 amps).

Figure 2:
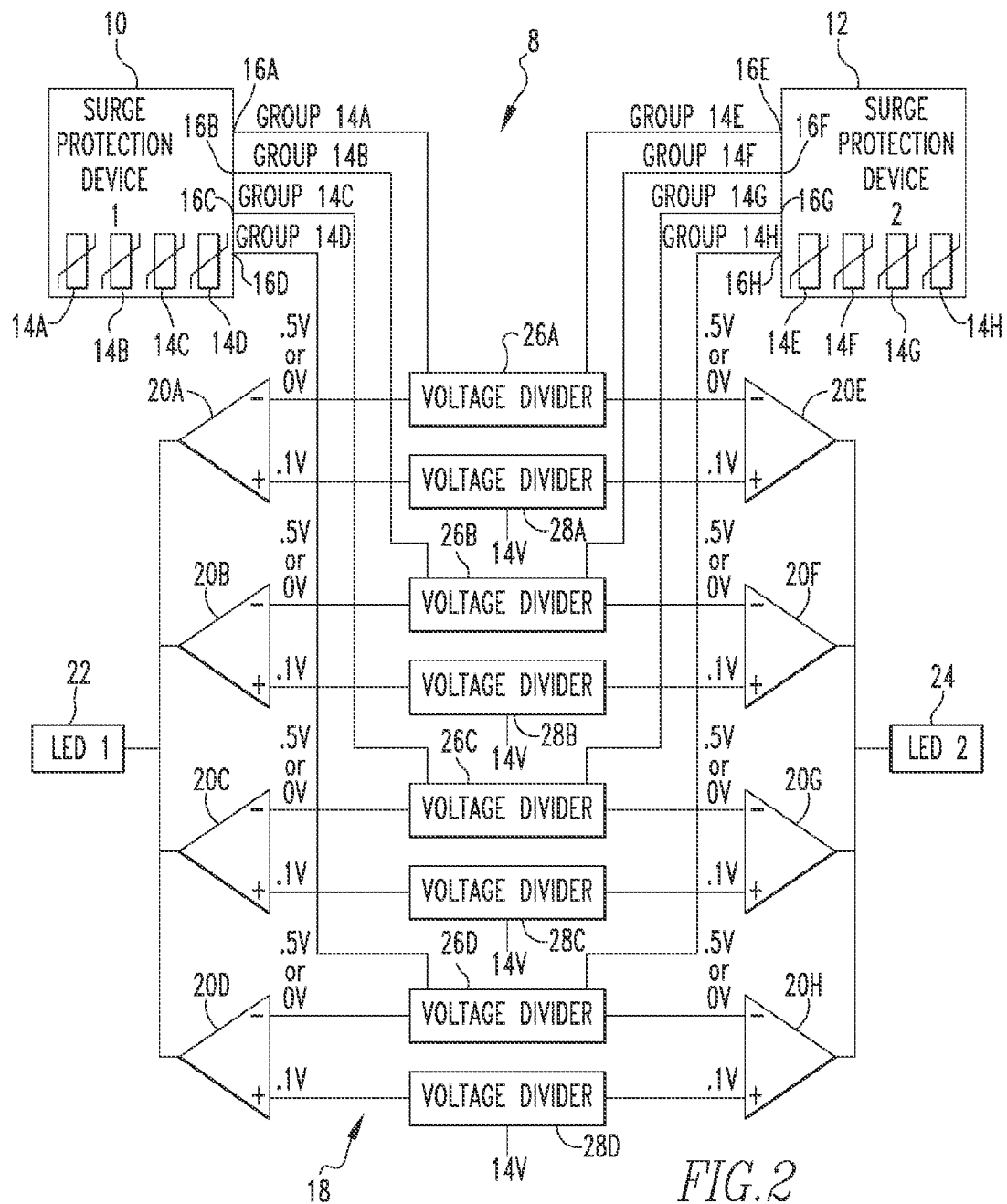
FIG. 2 is a schematic diagram of dual surge protection device according to one exemplary embodiment of the disclosed concept.

FIG. 2 is a schematic diagram of dual surge protection device 8 according to one exemplary embodiment of the disclosed concept. As seen in FIG. 2, dual surge protection device 8 includes a first surge protection device 10 and a second surge protection device 12. First surge protection device 10 and second surge protection device 12 each include a number of transient-suppressing elements that are provided in parallel with load 6 between power source 4 and ground. In the exemplary embodiment, first surge protection device 10 and second surge protection device 12 each include a number of MOVs as the transient-suppressing elements. It will be understood, however, that alternative transient-suppressing elements, such as silicon avalanche diodes (SADs) or gas tubes, may also be used. In the illustrated exemplary embodiment (wherein power source 4 is a three-phase AC source), surge protection device 10 and second surge protection device 12 each include four groups of MOVs 14, with each group 14 including one or more (e.g., four) MOVs and being associated with a particular phase/line of power source 4 (e.g., Phase A, Phase B, Phase C and Neutral). The MOV groups 14 are shown schematically in FIG. 2 and labeled with reference numbers 14A-14H.

In addition, surge protection device 10 includes a number of outputs 16, labeled 16A-16D, with each output 16 being associated with a respective one of the MOV groups 14A-14D. Surge protection device 10 is structured, using, for example, a number of transistor devices (e.g., FETs), such that, when configured as shown in FIG. 2, each output 16 will have one of the following two states: (i) 0.5V if all of the MOVs in the associated MOV group 14 are fully operational, and (ii) 0.0V if any (i.e., one or more) of the MOVs in the associated MOV group 14 has failed (e.g., due to the occurrence of a surge condition). Similarly, surge protection device 12 also includes a number of outputs 16, with each output 16 being associated with a respective one of the MOV groups 14E-14H. Like surge protection device 10, surge protection device 12 is structured such that, when configured as shown in FIG. 2, each output 16 will have one of the following two states: (i) 0.5V if all of the MOVs in the associated MOV group 14 are fully operational, and (ii) 0.0V if any (i.e., one or more) of the MOVs in the associated MOV group 14 has failed (e.g., due to the occurrence of a surge condition). The significance of this feature is described in detail below.

As seen in FIG. 2, dual surge protection device 8 further includes an I/O circuit 18. As described below, I/O circuit 18 is configured to indicate which one of the surge protections devices 10 or 12, if any, has experienced an MOV failure.

I/O circuit 18 in the exemplary embodiment includes eight comparators 20, labeled 20A-20H. The output of each of the comparators 20A-20D is coupled to a first LED 22 for driving LED 22 described herein, and the output of each of the comparators 20E-20H is coupled to a second LED 24 for driving LED 24 as described herein.

I/O circuit 18 also includes four first voltage dividers 26, labeled 26A-26D, and four second voltage dividers 28, labeled 28A-28D. In one non-limiting embodiment, each of the first voltage dividers 26 is a resistor. As seen in FIG. 2, outputs 16A and 16E are input into voltage divider 26A, outputs 16B and 16F are input into voltage divider 26B, outputs 16C and 16G are input into voltage divider 26C, and outputs 16D and 16H are input into voltage divider 26D. Voltage divider 26A is coupled to the negative input of comparator 20A and the negative input of comparator 20E, voltage divider 26B is coupled to the negative input of comparator 20B and the negative input of comparator 20F, voltage divider 26C is coupled to the negative input of comparator 20C and the negative input of comparator 20G, and voltage divider 26D is coupled to the negative input of comparator 20D and the negative input of comparator 20H.

As shown in FIG. 2, each voltage divider 28 has a 14 V input. Voltage divider 28A is coupled to the positive input of comparator 20A and the positive input of comparator 20E, voltage divider 28B is coupled to the positive input of comparator 20B and the positive input of comparator 20F, voltage divider 28C is coupled to the positive input of comparator 20C and the positive input of comparator 20G, and voltage divider 28D is coupled to the positive input of comparator 20D and the positive input of comparator 20H.

As a result of the above described configuration, the negative input of each comparator 20 will receive either 0.5V or 0.0V depending on the state of the associated output 16 and the associated MOV group 14. In particular, if all of the MOVs in an MOV group 14 are fully operational, the state of the associated output 16 will be 0.5V and the negative input of the associated comparator 20 will receive 0.5V. If, however, any MOV in an MOV group 14 has failed, the state of the associated output 16 will be 0.0V and the negative input of the associated comparator 20 will receive 0.0V. Furthermore, the positive input of each comparator 20 will receive a constant 0.1 V (via the 14 V input and the associated voltage divider 28).

Moreover, the output of each comparator 20 will depend on the current state of the negative input thereof (as noted above, the positive input of each comparator 20 is at a constant 0.1V). In particular, if the negative input is 0.5V, the output of the comparator 20 will be low. If the negative input is 0.0V, the output of the comparator 20 will be high. Furthermore, if the output of any one of the comparators 20A, 20B, 20C or 20D is high, led 22 will be lit (otherwise LED 22 will not be lit). Similarly, if the output of any one of the comparators 20E, 20F, 20G or 20H is high, led 24 will be lit (otherwise LED 24 will not be lit).

Thus, in operation, if all MOVs in a surge protection devices 10 and 12 are operational, all of the outputs 16 of the surge protection device 10, 12 will be 0.5V and all of the negative inputs of the associated comparators 20 will be 0.5V. In this condition, both LED 22 and LED 24 will be off (unlit). If any of the MOVs in MOV groups 14A, 14B, 14C or 14D of surge protection device 10 fails, LED 22 will be turned on (lit), and if any of the MOVs in MOV groups 14E, 14F, 14G or 14H of surge protection device 12 fails, LED 24 will be will be turned on (lit). A lit LED 22 or 24 will indicate to an observer that the associated surge protection device 10 or 12 has had an MOV failure and therefore needs to be replaced.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A surge protection apparatus structured and configured for being coupled between a power source and a neutral conductor or a ground conductor in parallel with a load, comprising:
a first surge protection device having a number of first transient suppressing elements;
a second surge protection device having a number of second transient suppressing elements, wherein the first surge protection device and the second surge protection device are connected in parallel with one another within the surge protection apparatus such that the first surge protection device and the second surge protection device are configured to be coupled between the power source and the neutral conductor or the ground conductor in parallel with the load responsive to the surge protection apparatus being coupled to the power source; and
a circuit coupled to the first surge protection device and the second surge protection device, the circuit having a number of display elements, wherein the circuit is structured and configured to receive input signals from the first surge protection device and the second surge protection device and (i) responsive to any one of the first transient suppressing elements failing, causes the number of display elements to provide a first indication indicating that at least one of the first transient suppressing elements has failed, and (ii) responsive to any one of the second transient suppressing elements failing, cause the number of display elements to provide a second indication indicating that at least one of the second transient suppressing elements has failed.

2. The surge protection apparatus according to claim 1, wherein the first and second indications will both be provided when any one of the first transient suppressing elements has failed and when any one of the second transient suppressing elements has failed.

3. The surge protection apparatus according to claim 1, wherein the number of display elements comprise a first display device and a second display device.

4. The surge protection apparatus according to claim 1, wherein the first display device comprises a first LED, wherein the second display device comprises a second LED, wherein the first indication comprises the first LED being lit and wherein the second indication comprises the second LED being lit.

5. The surge protection apparatus according to claim 1, wherein the number of first transient suppressing elements comprises a number of first MOVs and wherein the number of second transient suppressing elements comprises a number of second MOVs.

6. A surge protection apparatus, comprising:
a first surge protection device having a number of first transient suppressing elements;
a second surge protection device having a number of second transient suppressing elements; and
a circuit coupled to the first surge protection device and the second surge protection device, the circuit having a number of display elements, wherein the first display device comprises a first LED, wherein the second display device comprises a second LED, wherein the first indication comprises the first LED being lit and wherein the second indication comprises the second LED being lit, and wherein the circuit is structured and configured to receive input signals from the first surge protection device and the second surge protection device and (i) responsive to any one of the first transient suppressing elements failing, causes the number of display elements to provide a first indication indicating that at least one of the first transient suppressing elements has tailed, and (ii) responsive to any one of the second transient suppressing elements failing cause the number of display elements to provide a second indication indicating that at least one of the second transient suppressing elements has failed, wherein the circuit comprises a number of first comparators coupled to the first LED, each of the first comparators receiving a respective first input that is based on a particular one of the input signals that is associated with a respective one of the first transient suppressing elements, the circuit being structured to cause each of the first comparators to output a high signal in response to the particular one of the input signals received by the first comparator indicating a failure, wherein the circuit comprises a number of second comparators coupled to the second LED, each of the second comparators receiving a respective first input that is based on a particular one of the input signals that is associated with a respective one of the second transient suppressing elements, the circuit being structured to cause each of the second comparators to output a high signal in response to the particular one of the input signals received by the second comparator indicating a failure.

7. The surge protection apparatus according to claim 6, wherein each first input received by the first comparators is either a 0.0V signal or a first voltage signal having a first level, wherein each first input received by the second comparators is either the 0.0V signal or the first voltage level, wherein each of the first comparators and each of the second comparators receives a second input that is a second voltage signal having a second level, wherein the first level is greater than the second level.

8. The surge protection apparatus according to claim 7, wherein each first input received by each first comparator will be a 0.0V signal responsive to the first transient suppressing element associated therewith failing, and wherein each first input received by each second comparator will be a 0.0V signal responsive to the second transient suppressing element associated therewith failing.

9. A method of indicating failures in a surge protection apparatus, comprising:
providing a surge protection apparatus between a power source and a neutral conductor or a ground conductor in parallel with a load, the surge protection apparatus having a first surge protection device having a number of first transient suppressing elements, and a second surge protection device having a number of second transient suppressing elements, wherein the first surge protection device and the second surge protection device are connected in parallel with one another within the surge protection apparatus such that the first surge protection device and the second surge protection device are configured to be coupled between the power source and the neutral conductor or the ground conductor in parallel with the load responsive to the providing;

receiving input signals from the first surge protection device and the second surge protection device;

responsive to the input signals indicating that any one of the first transient suppressing elements has failed, providing a first visual indication indicating that at least one of the first transient suppressing elements has failed; and responsive to the input signals indicating that any one of the second transient suppressing elements has failed, providing a second visual indication indicating that at least one of the second transient suppressing elements has failed.

10. The method according to claim 9, wherein the providing a first visual indication comprises causing a first LED to be lit, and wherein the providing a second visual indication comprises causing a second LED to be lit.

11. The method according to claim 9, wherein the input signals comprise a number of first input signals from the first surge protection device and a number of first input signals from the second surge protection device, wherein the providing the first visual indication is performed responsive to any one of the first input signals indicating a failure, and wherein the providing the second visual indication is performed responsive to any one of the second input signals indicating a failure.

12. The method according to claim 11, wherein each of the first input signals is either a 0.0V signal or a first voltage signal having a first level, wherein each of the second input signals is either the 0.0V signal or the first voltage signal having the first level, and wherein the 0.0V signal indicates a failure.

13. The method according to claim 9, wherein the number of first transient suppressing elements comprises a number of first MOVs and wherein the number of second transient suppressing elements comprises a number of second MOVs.

14. A circuit for use with a surge protection apparatus having a first surge protection device having a number of first transient suppressing elements and a second surge protection device having a number of second transient suppressing elements, comprising:

a number of display elements;

a circuit portion including a plurality of comparators and being coupled to the number of display elements, wherein the circuit portion is structured and configured to receive input signals from the first surge protection device and the second surge protection device and (i) responsive to any one of the first transient suppressing elements failing, causing the number of display elements to provide a first indication indicating that at least one of the first transient suppressing elements has failed, and (ii) responsive to any one of the second transient suppressing elements failing, causing the number of display elements to provide a second indication indicating that at least one of the second transient suppressing elements has failed, wherein the number of display elements comprise a first display device and a second display device, wherein the first display device comprises a first LED, wherein the second display device comprises a second LED, wherein the first indication comprises the first LED being lit, wherein the second indication comprises the second LED being lit, and wherein the circuit portion comprises a number of first comparators coupled to the first LED, each of the first comparators receiving a respective first input that is based on a particular one of the input signals that is associated with a respective one of the first transient suppressing elements, the circuit portion being structured to cause each of the first comparators to output a high signal in response to the particular one of the input signals received by the first comparator indicating a failure, wherein the circuit portion comprises a number of second comparators coupled to the second LED, each of the second comparators receiving a respective first input that is based on a particular one of the input signals that is associated with a respective one of the second transient suppressing elements, the circuit portion being structured to cause each of the second comparators to output a high signal in response to the particular one of the input signals received by the second comparator indicating a failure.

* * * * *